Patented Oct. 31, 1933

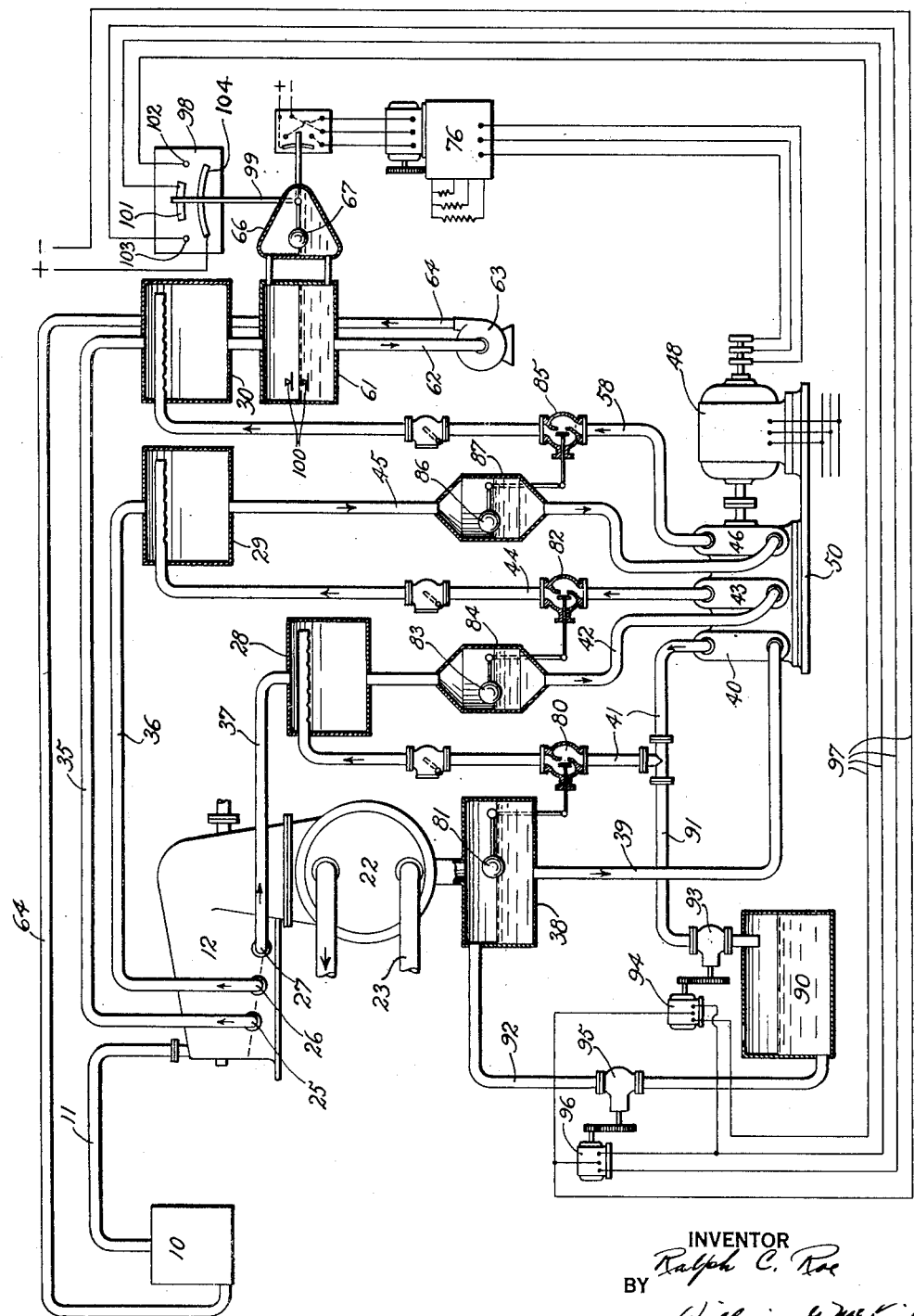

1,932,484

UNITED STATES PATENT OFFICE 1,932,484

POWER PLANT

Ralph C. Roe, Englewood, N. J., assignor of one-half to Stephen W. Borden, Summit, N. J.

Application January 28, 1930. Serial No. 423,912

16 Claims. (Cl. 60—67)

My invention relates to steam power plants and more particularly to steam power plants wherein a turbine is used for power purposes and from which steam is conducted to heaters for heating feed water to be used in the steam generating unit of the plant. Still more particularly my invention relates to steam power plants wherein feed water is successively heated to higher temperatures in direct contact with steam withdrawn from a plurality of points of different pressure in a turbine.

The principal object of my invention is to provide a steam power plant having a feed water system of the open heater type with control of water flow wherein flow of water is automatically coordinated to steam flow and which has complete automatic control with all necessary variation factors taken care of, using simple devices capable of wide variation of control and which is particularly advantageous in connection with operation involving periods of low load.

Further objects and the nature and advantages of the invention will become apparent from a consideration of the following specification taken in conjunction with the accompanying drawing showing, more or less diagrammatically, a steam power plant in accordance with the invention.

Referring to the drawing, reference character 10 designates a steam generating unit comprising one or more boilers which may be of any known type, and which may be fired in any suitable way. The steam produced in the boiler unit passes through conduit 11 and into a turbine 12 comprising the usual turbine wheels and guides. Steam passes through the turbine to produce power and into a condenser 22 shown as being cooled by water supplied through conduit 23. The turbine is shown as having three points of steam extraction, 25, 26 and 27.

In the steam plant illustrated there are three open heaters designated by the reference characters 28, 29 and 30. Any of various types of feed water heaters may be used. A conduit 35 connects extraction point 25 with open heater 30. A conduit 36 in similar manner connects extraction point 26 with open heater 29. A conduit 37 in similar manner connects point 27 with open heater 28.

Steam condensed in condenser 22 flows into a tank or hot-well 38. A conduit 39 conducts water from tank 38 to a low pressure section or unit 40 of a pump assembly 50. Water passes from section 40 through conduit 41 and is sprayed or otherwise introduced into open heater 28 into contact with steam passing thereinto from conduit 37. The water entering heater 28 condenses steam and the sum of the entering water and the condensate flows down within heater 28 and through conduit 42 into a section 43 of the pump mechanism which operates at a higher pressure than section 40. From pump section 43 the water passes through conduit 44 and is in like manner introduced into the heater 29 where it condenses steam received from conduit 36. The sum of the water entering heater 29 and the condensate formed therein flows downwardly and through conduit 45 into pump section 46. Water leaves pump section 46 by way of conduit 58 and enters heater 30.

Pump assembly 50 comprising sections 40, 43 and 46 comprises a housing enclosing one or more pump wheels for the different pump sections, all being mounted on a common shaft and the sections being out of communication except through the conduits and heaters above described. An electric motor 48 drives pump assembly 50.

The sum of the water passing through conduit 58 and the condensate formed in heater 30 flows down into a tank 61. A conduit 62 conducts the water from tank 61 to a pump 63 which forces the water through conduit 64 into the steam generating unit 10. It will be seen that the feed water passing through heaters 28, 29 and 30 is progressively heated to higher temperatures by the steam which is withdrawn from the different points of different pressure of the turbine sections.

In my copending application, Serial No. 399,152, filed October 12th, 1929, Pat. No. 1,857,332, granted May 10, 1932, I have pointed out that a turbine has what is known as characteristics constituting inherent features of the turbine due to design and operation and that these characteristics could be utilized in connection with characteristics of centrifugal pump mechanism for obtaining coordination between feed water flow and pressures and the flow and pressures of the turbine for different loads. I further pointed out that this coordination was obtained by a combination of pumping mechanism and open feed water heaters, of, in general, the same nature as herein disclosed. I have further pointed out that variations for adjusting operation can be obtained by the expedient of using water legs and that this is advantageous in practice since it makes it feasible to combine pump sections into a single assembly driven by a single motor and controlled by a single speed control device, and further permits a greater latitude in types of speed regulators which can be used.

The system described in the copending application is particularly suitable for use in plants where the steam pressure is relatively high and in plants where the turbine operates at relatively high load factors or in what is commonly known as "base load plants". In the present case I am more concerned with plants operating with relatively low steam pressures and plants of the "standby" type where the turbines operate for considerable periods with relatively light loads or even no load.

In the copending application I have utilized the characteristics of water legs in conjunction with pump sections for the purpose of compensating for inequalities between the pump sections, the main coordinating factor being the variable speed pump. In the present application the pump may be run at constant speed and the entire coordination taken care of by means of the variable water legs.

The effect produced by the variable water legs may consist entirely of static pressure produced by a column of water; or a similar effect may be produced by throttling the discharge of the pumps. In the copending application I have shown one pumping section only equipped with a throttling valve while in the present application all of the units are so equipped.

As described in my previous application, the motor 48 is controlled by a controller 76, which in turn is controlled by a float 67 arranged in a vessel 66 to have movement in accordance with variations of water level in tank 61. This arrangement is such as to tend to maintain the level of water within tank 61 within a given range of levels.

However, at very light loads it is necessary to have supplementary regulation since it is not practical to operate variable speed motors below a definite speed reduction. This is particularly true of slip ring motors. Where the supplementary control has sufficient range, as would be the case in this application, the coordination of water quantities and pressures to the turbine characteristics can be entirely done by the float and valve controls, 81, 80, 83, 82, 86 and 85 and the pump may be operated at constant speed. For certain plants, particularly of the type above referred to, the advantages obtained by this system more than offset the disadvantage which may occur in decrease of pumping efficiency due to constant speed of the pump mechanism.

In conduit 41 there is a valve 80. This valve is controlled by a float 81 in vessel 38. The arrangement is such that if float 81 rises, valve 80 is opened to increase the flow therethrough, thus permitting the level to fall and return to its normal value in vessel 38. In conduit 44 is a valve 82 which is controlled by a float 83 in a vessel 84 inserted in conduit 42. This arrangement is likewise such that if the level rises in vessel 84, valve 82 will be opened to a greater degree and more water will be discharged by the pump unit 43 whereby the level in vessel 84 will return to its original position. Conversely a lowering of level in vessel 84 will close, more or less, the valve 82. In conduit 58 is a valve 85 similarly controlled by a float 86 in vessel 87. If the water level in vessel 87 rises, valve 85 is opened more to increase the flow therethrough.

It will be seen that this arrangement will provide a proper amount of liquid in the feed water system comprising the open heaters, the pump mechanism and the connected conduits.

The system which I have so far described will operate satisfactorily under normal conditions, but in steam power plants abnormal conditions must be taken care of. To illustrate, if the boiler feed pump 63 were accidentally shut down for a period, the feed water system might become too full of water. With open heaters in the system it is obviously desirable to prevent such excess of water in the feed water system as it would partially or wholly flood the open heaters. In order to take care of such contingencies I have provided a reserve tank 90 which is connected by conduits 91 and 92 to the feed water system. Conduit 91 extends from conduit 41 to tank 90. Conduit 92 extends from tank 90 to vessel 38. In conduit 91 is a valve 93 controlled by a motor 94. In conduit 92 is a valve 95 controlled by a motor 96. Motors 94 and 96 are connected by electric connections 97 to a controller 98 which is in turn operated by a lever 99 actuated by float 67. Lever 99 makes connection between a contact 104 and either an extended contact 101 or point contacts 102 and 103. There are gaps between contact 101 and the contacts 102 and 103.

This arrangement for taking care of abnormal conditions operates as follows:

So long as the level of water in tank 61 remains within a given range, for example, as indicated by the level marks 100, both valves 93 and 95 will be closed. This is so as long as lever 99 is in contact with contact member 101. Suppose the level rises beyond the upper mark designated 100 and still further so that the lever 99 contacts the contact point 102. When this happens, the circuit of motor 94 will be closed and motor 94 will be energized to open valve 93. As a result of this, pump section 40 will pump water into tank 90 instead of into heater 28. This will continue so long as the level remains that high in tank 61. When the level in tank 61 starts dropping again so that lever 99 is moved out of contact with contact point 102 and returns back to contact with contact member 101, valve 93 will be operated by motor 94 to close again. Should the level in vessel 61 drop so that lever 99 contacts contact point 103, motor 96 will be energized by the closing of its circuit through contacts 103 and 104 to open valve 95. Since conduit 92 is connected to the upper part of vessel 38 which is at the same pressure as the condenser, namely, at a vacuum, water will be drawn from reserve tank 90 into vessel 38. When the level again rises in tank 61 and the lever 99 returns to contact with contact member 101, motor 96 will be energized to close valve 95. The motors 94 and 96 will be equipped with known means for stopping the same when the valves reach full open and full closed positions respectively. Thus it will be seen that the water will be maintained in the feed water system so as not to flood the open heaters and that the shifting of water between reserve tank 90 and the feed water system is depending upon the quantity of feed water in the feed water system.

While I have described certain features more or less in detail, it will be understood that the invention may employ various devices of differing form and construction and it is to be understood that the invention is not limited except by the scope of the appended claims taken in conjunction with the state of the prior art.

What I claim is:

1. A steam power plant comprising a steam generating unit; a turbine supplied with steam from the steam generating unit; a feed water system comprising a plurality of direct steam and water contact heaters, a condenser connected to the turbine and means for pumping water from the condenser through the heaters and into the steam generating unit comprising a plurality of centrifugal pump units having suction and discharge conduits, valves in the discharge conduits and floats in the suction conduits for controlling the valves; connections between the feed water heaters and points of different pressure of the turbine; a reserve tank; means for transferring water between the reserve tank and the feed water system; and means for controlling such transfer in accordance with variations of amount of water discharged from one of said heaters.

2. A steam power plant comprising a steam generating unit; a turbine supplied with steam from the steam generating unit; a feed water system comprising a plurality of direct steam and water contact heaters, a condenser connected to the turbine and means for pumping water from the condenser through the heaters and into the steam generating unit comprising a plurality of centrifugal pump units having suction and discharge conduits, valves in the discharge conduits and floats in the suction conduits for controlling the valves; connections between the feed water heaters and points of different pressure of the turbine; a tank in said feed water system; a reserve tank; means for transferring water between the reserve tank and the feed water system; and means for controlling such transfer in accordance with high and low levels of a body of water in the first-mentioned tank.

3. A steam power plant comprising a steam generating unit; a turbine supplied with steam from the steam generating unit; a feed water system comprising a plurality of direct steam and water contact heaters, a condenser connected to the turbine and means for pumping water from the condenser through the heaters and into the steam generating unit including a centrifugal pump assembly; connections between the feed water heaters and points of different pressure of the turbine; a reserve tank; means for transferring water between the reserve tank and the feed water system; and common means for varying the speed of the pump assembly and controlling the transfer of water between the feed water system and the reserve tank.

4. A steam power plant comprising a steam generating unit; a turbine supplied with steam from the steam generating unit; a feed water system comprising a plurality of direct steam and water contact heaters, a condenser connected to the turbine and means for pumping water from the condenser through the heaters and into the steam generating unit including a centrifugal pump assembly; connections between the feed water heaters and points of different pressure of the turbine; a reserve tank; means for transferring water between the reserve tank and the feed water system; and common means for varying the speed of the pump assembly and controlling the transfer of water between the feed water system and the reserve tank responsive to variations in amount of water discharged from one of said heaters.

5. A steam power plant comprising a steam generating unit; a turbine supplied with steam from the steam generating unit; a feed water system comprising a plurality of direct steam and water contact heaters, a condenser connected to the turbine and means for pumping water from the condenser through the heaters and into the steam generating unit including a centrifugal pump assembly; connections between the feed water heaters and points of different pressure of the turbine; a reserve tank; means for transferring water between the reserve tank and the feed water system; and common means for varying the speed of the pump assembly and controlling the transfer of water between the feed water system and the reserve tank operating to transfer water from the feed water system to the reserve tank when the amount of water discharged from one of said heaters is excessively great and to transfer water from the reserve tank to the feed water system when said amount of water is excessively small.

6. A steam power plant comprising a steam generating unit; a turbine supplied with steam from the steam generating unit; a feed water system comprising a plurality of direct steam and water contact heaters, a condenser connected to the turbine, means for pumping water from the condenser through the heaters and into the steam generating unit including a centrifugal pump assembly, and a tank in said feed water system; a reserve tank; means for transferring water between the reserve tank and the feed water system; means responsive to normal variations of water level in the first-mentioned tank for varying the speed of the pump assembly; and means responsive to abnormally high and low levels of water in the first-mentioned tank for controlling the transfer of water between the reserve tank and the feed water system.

7. A steam power plant comprising a steam generating unit, a turbine supplied with steam from the steam generating unit, a plurality of direct steam and water contact feed water heaters, bleed conduits connecting each of said feed water heaters with points of different pressure in the turbine, pumping mechanism for pumping the feed water successively through the feed water heaters in the order of increasing steam pressure comprising a plurality of centrifugal pump units and means for driving the pumping mechanism, suction connections and discharge connections for the pump units connecting with the heaters, valves in the discharge connections for controlling the rate of discharge from each of the pump units, automatic means for controlling the valves, and automatic means for controlling the driving means for the pumping mechanism.

8. A steam power plant comprising a steam generating unit; a turbine supplied with steam from the steam generating unit; a feed water system comprising a plurality of direct steam and water contact heaters, a condenser connected to the turbine and means for pumping water from the condenser through the heaters and into the steam generating unit comprising centrifugal pumping mechanism and suction and discharge connections associated therewith, the suction and discharge connections being arranged to hold columns of water effective to adjust the rate of flow of liquid through the pumping mechanism; connections between the feed water heaters and points of different pressure of the turbine; a reserve tank; means for transferring water between the reserve tank and the feed water system; and means for controlling such transfer in accordance with variations of amount of water in a part of the feed water system.

9. A steam power plant comprising a steam generating unit, a turbine supplied with steam from the steam generating unit, a condenser supplied with steam from the turbine, a plurality of direct steam and water contact feed water heaters, bleed conduits connecting each of said feed water heaters with points of different pressure in the turbine, centrifugal pumping mechanism for pumping the feed water successively through the feed water heaters in the order of increasing steam pressure comprising a plurality of centrifugal pump units including a boiler feed pump connected to receive water from the feed water heater of highest pressure and to deliver water to the steam generating unit, means to conduct condensate from the condenser to the pump unit of lowest pressure, valve mechanism controlling the flow of feed water into the feed water heater of lowest pressure and means to automatically control said valve mechanism normally in accordance with the amount of steam being condensed.

10. A steam power plant comprising a steam generating unit, a turbine supplied with steam from the steam generating unit, a condenser supplied with steam from the turbine, a plurality of direct steam and water contact feed water heaters, bleed conduits connecting each of said feed water heaters with points of different pressure in the turbine, centrifugal pumping mechanism for pumping the feed water successively through the feed water heaters in the order of increasing steam pressure comprising a plurality of centrifugal pump units including a boiler feed pump connected to receive water from the feed water heater of highest pressure and to deliver water to the steam generating unit, means to conduct condensate from the condenser to the pump unit of lowest pressure, valve mechanism controlling the flow of feed water into the feed water heater of lowest pressure, and water level responsive means to automatically control said valve mechanism normally in accordance with the amount of steam being condensed.

11. A steam power plant comprising a steam generating unit; a turbine supplied with steam from the steam generating unit; a feed water system comprising a plurality of direct steam and water contact heaters, a condenser connected to the turbine, means for pumping water from the condenser through the heaters and into the steam generating unit, and means to provide a pool of water in said feed water system; connections between the feed water heaters and points of different pressure of the turbine; a reserve tank; means for transferring water between the reserve tank and the feed water system; and means for controlling such transfer in accordance with variations of quantity of water forming said pool.

12. A steam power plant comprising a steam generating unit; a turbine supplied with steam from the steam generating unit; a feed water system comprising a plurality of direct steam and water contact heaters, a condenser connected to the turbine, means for pumping water from the condenser through the heaters and into the steam generating unit comprising a plurality of centrifugal pump units having suction and discharge conduits, valves in the discharge conduits and floats in the suction conduits for controlling the valves, and means to provide a pool of water in said feed water system; connections between the feed water heaters and points of different pressure of the turbine; a reserve tank; means for transferring water between the reserve tank and the feed water system; and means for controlling such transfer in accordance with high and low levels of said pool.

13. A steam power plant comprising a steam generating unit; a turbine supplied with steam from the steam generating unit; a feed water system comprising a plurality of direct steam and water contact heaters, a condenser connected to the turbine, means for pumping water from the condenser through the heaters and into the steam generating unit including a centrifugal pump assembly and means providing a pool of feed water in the feed water system; connections between the feed water heaters and points of different pressure of the turbine; a reserve tank; means for transferring water between the reserve tank and the feed water system; and common means for varying the speed of the pump assembly and controlling the transfer of water between the feed water system and the reserve tank responsive to variations of level of said pool.

14. A steam power plant comprising a steam generating unit; a turbine supplied with steam from the steam generating unit; a feed water system comprising a plurality of direct steam and water contact heaters, a condenser connected to the turbine, means for pumping water from the condenser through the heaters and into the steam generating unit including a centrifugal pump assembly and a tank receiving water from the feed water heater of highest pressure; connections between the feed water heaters and points of different pressure of the turbine; a reserve tank; means for transferring water between the reserve tank and the feed water system; and common means for varying the speed of the pump assembly and controlling the transfer of water between the feed water system and the reserve tank operating to transfer water from the feed water system to the reserve tank when the level of water in the first-mentioned tank is excessively high and to transfer water from the reserve tank to the feed water system when the level of water in said first-mentioned tank is excessively low.

15. A steam power plant comprising a steam generating unit, a turbine supplied with steam from the steam generating unit, a plurality of direct steam and water contact feed water heaters, bleed conduits connecting each of said feed water heaters with points of different pressure in the turbine, means for pumping the feed water successively through the feed water heaters in the order of increasing pressure comprising a plurality of centrifugal pump units and including a vessel connected to receive water from the feed water heater of highest pressure and a boiler feed pump connected to receive water from said vessel and to deliver water to the steam generating unit, valve mechanism controlling the flow of feed water into the feed water heater of lowest pressure, and means to automatically control said valve mechanism in accordance with variations of level of water in said vessel.

16. A steam power plant comprising a steam generating unit, a turbine supplied with steam from the steam generating unit, a plurality of direct steam and water contact feed water heaters, bleed conduits connecting each of said feed water heaters with points of different pressure in the turbine, means for pumping the feed water successively through the feed water heaters in the order of increasing pressure comprising a plurality of centrifugal pump units and including a vessel connected to receive water from the feed water heater of highest pressure and a boiler feed pump connected to receive water from said vessel and to deliver water to the steam generating unit, valve mechanism controlling the flow of feed water into the feed water heater of lowest pressure, and a float valve responsive to variations of water level in said vessel for controlling said valve mechanism.

RALPH C. ROE.